United States Patent
Vakharwala et al.

(10) Patent No.: US 12,222,873 B2
(45) Date of Patent: Feb. 11, 2025

(54) METHOD AND APPARATUS TO ENABLE A CACHE (DEVPIC) TO STORE PROCESS SPECIFIC INFORMATION INSIDE DEVICES THAT SUPPORT ADDRESS TRANSLATION SERVICE (ATS)

(71) Applicant: Intel Corporation, Santa Clara, CA (US)

(72) Inventors: Rupin Vakharwala, Hillsboro, OR (US); Vedvyas Shanbhogue, Austin, TX (US)

(73) Assignee: Intel Corporation, Santa Clara, CA (US)

( * ) Notice: Subject to any disclaimer, the term of this patent is extended or adjusted under 35 U.S.C. 154(b) by 555 days.

(21) Appl. No.: 17/473,468

(22) Filed: Sep. 13, 2021

(65) Prior Publication Data
US 2021/0406195 A1   Dec. 30, 2021

Related U.S. Application Data

(60) Provisional application No. 63/181,871, filed on Apr. 29, 2021.

(51) Int. Cl.
*G06F 12/1027* (2016.01)
*G06F 13/16* (2006.01)
*G06F 13/42* (2006.01)

(52) U.S. Cl.
CPC ...... *G06F 12/1027* (2013.01); *G06F 13/1668* (2013.01); *G06F 13/4282* (2013.01); *G06F 2213/0026* (2013.01)

(58) Field of Classification Search
CPC ............ G06F 12/1027; G06F 13/1668; G06F 13/4282; G06F 2213/0026; G06F 12/1036; G06F 2212/1004; G06F 2212/651; G06F 2212/682; G06F 12/1081; G06F 13/4295; G06F 2212/1024; G06F 2212/657; G06F 2212/681; G06F 12/1009; G06F 2212/652; G06F 2212/683
See application file for complete search history.

(56) References Cited

U.S. PATENT DOCUMENTS

| | | | | |
|---|---|---|---|---|
| 6,055,600 | A * | 4/2000 | Nguyen | G06F 12/0897 711/119 |
| 10,719,453 | B1 * | 7/2020 | Abhishek Raja | G06F 12/0802 |
| 2002/0144077 | A1 * | 10/2002 | Andersson | G06F 12/145 711/E12.102 |

(Continued)

OTHER PUBLICATIONS

U.S. Appl. No. 16/912,542, filed Jun. 25, 2020, entitled "Secure Address Translation Services Using Cryptographically Protected Host Physical Addresses," by Michael Kounavis et al.

(Continued)

*Primary Examiner* — Charles Rones
*Assistant Examiner* — Hewy H Li
(74) *Attorney, Agent, or Firm* — Eversheds Sutherland (US) LLP

(57) ABSTRACT

Embodiments described herein may include apparatus, systems, techniques, or processes that are directed to PCIe Address Translation Service (ATS) to allow devices to have a DevTLB that caches address translation (per page) information in conjunction with a Device ProcessInfoCache (DevPIC) that will store process specific information. Other embodiments may be described and/or claimed.

19 Claims, 12 Drawing Sheets

400

| DevTLB (ATC) | 410 |
| --- | --- |
| VA | HPA |
| A ... A+2M | X ... X+2M |
| | |
| | |
| | |
| | |

413₀ ... 412ₙ

| DevPIC (PIC) | | 420 |
| --- | --- | --- |
| PASID | KAS | Process Info |
| P | 0 | 7FFF |
| P | 1 | 7E |
| R | 0 | 7FFF |
| | | |
| | | |

422₀ ... 422ₙ

Device Process Cache (DevPIC)

(56) References Cited

U.S. PATENT DOCUMENTS

| | | | | |
|---|---|---|---|---|
| 2006/0181909 A1* | 8/2006 | Hinojosa | ................ | G11C 15/00 |
| | | | | 365/49.1 |
| 2015/0242319 A1* | 8/2015 | Evans | ................ | G06F 12/1036 |
| | | | | 711/207 |
| 2016/0140050 A1* | 5/2016 | Kujtkowski | ........ | G06F 12/1027 |
| | | | | 711/108 |
| 2018/0011651 A1* | 1/2018 | Sankaran | ............ | G06F 12/1009 |
| 2018/0210842 A1* | 7/2018 | Nuzman | ............. | G06F 12/1027 |

OTHER PUBLICATIONS

U.S. Appl. No. 17/133,570, filed Dec. 23, 2020, entitled "64-Bit Virtual Addresses Having Metadata Bit(s) and Canonicality Check That Does Not Fail Due to Non-Canonical Values of Metadata Bit(s)," by Vedvyas Shganbhogue et al.

\* cited by examiner

METHOD AND APPARATUS TO ENABLE A CACHE (DEVPIC) TO STORE PROCESS SPECIFIC INFORMATION INSIDE DEVICES THAT SUPPORT ADDRESS TRANSLATION SERVICE (ATS)

This application claims priority to U.S. Provisional Patent Application No. 63/181,871, filed on Apr. 29, 2021, in the names of Rupin H. Vakharwala and Vedvyas Shanbhogue, entitled "Method And Apparatus To Enable A Cache (DEVPIC) To Store Process Specific Information Inside Devices That Support Address Translation Service (ATS)," the disclosure of which is hereby incorporated by reference.

TECHNICAL FIELD

Embodiments of the present disclosure generally relate to the field of computing, in particular to storing process specific information in a device on a bus.

BACKGROUND

There has been increased adoption of devices that support the Address Translation Service (ATS) of a Peripheral Component Interconnect Express (PCIe) architecture. More specifically, according to the PCIe Base Specification version 5.0 (2019), ATS provides a set of transactions for PCIe components to exchange and use translated addresses in support of native input/output (VO) virtualization. However inefficiencies still exist.

BRIEF DESCRIPTION OF THE DRAWINGS

Embodiments will be readily understood by the following detailed description in conjunction with the accompanying drawings. To facilitate this description, like reference numerals designate like structural elements. Embodiments are illustrated by way of example and not by way of limitation in the figures of the accompanying drawings.

DETAILED DESCRIPTION

Figure 1:
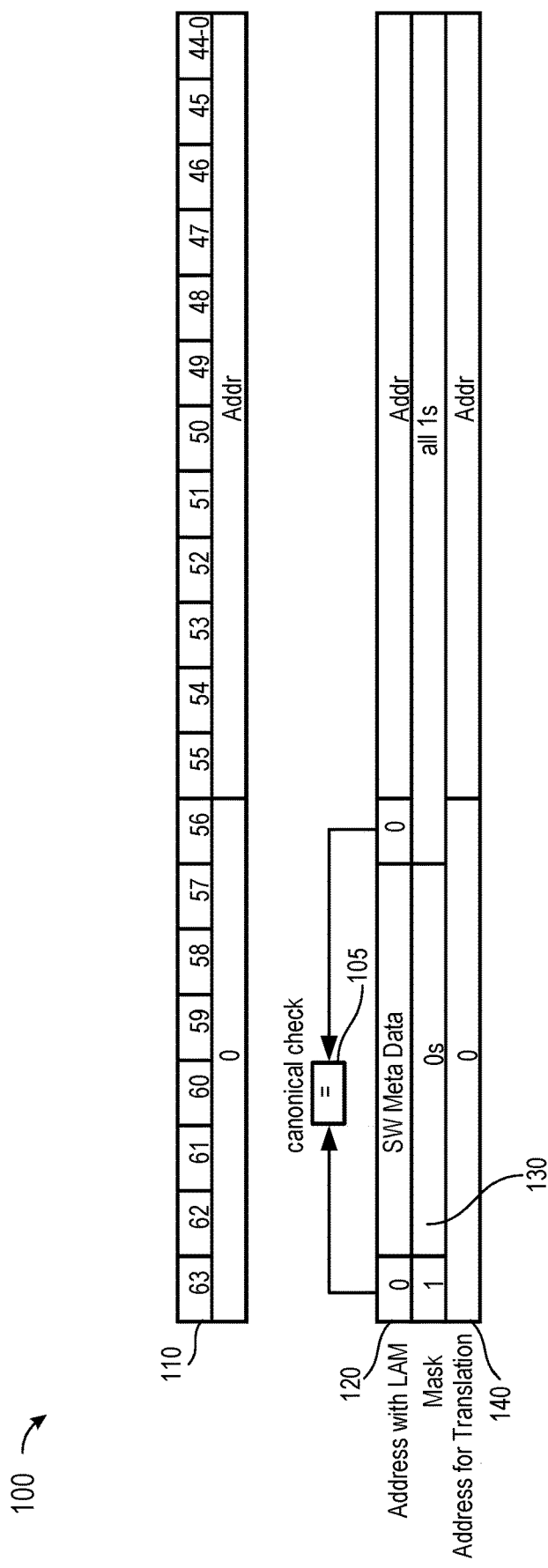
FIG. 1 is a diagram showing an example of Linear Address Masking (LAM).

Embodiments described herein may include apparatus, systems, techniques, and/or processes that are directed to enable a cache to store process specific information inside devices that support ATS. In legacy implementations, Linear Address Masking (LAM) and Shared Virtual Memory (SVM) may not co-exist, and in these implementations software makes them mutually exclusive so that users can use one but not both. Embodiments described herein enable users to use both LAM and SVM together and get benefits of both features.

Legacy implementations may include building a software-based solution where software can perform required address masking before submitting any address to a SVM device. However, such approach is likely reserved for a super user like a cloud service provider who controls the entire software stack and is unlikely to be feasible for most users. In addition, these legacy implementations may only allow applications that do not enable LAM to use SVM devices. Since LAM enabling happens early it is likely that SVM will not be enabled for such applications. The cost of software work around to sanitize pointers is quite high which will also deter adoption of SVM.

In embodiments described herein, a PCIe Address Translation Service (ATS) allows devices to have a device translation lookaside buffer (DevTLB) (aka address translation cache (ATC)) that caches address translation (per page) information. Embodiments described herein may include the addition of a memory, which may be implemented as a dedicated cache memory, to store process specific information. In an implementation, this cache memory is called a Device ProcessInfoCache (DevPIC) that stores process specific information. In embodiments, additional pieces of information that may be referred to as "Domain ID" may be process specific to devices, which would allow a reduction of latency of invalidating DevTLBs in devices, and thereby improve performance.

In some embodiments, due to the SVM, both a central processing unit (CPU) and/or other processing units (XPU) may have similar address translation/manipulation infrastructure, which may call for other pieces of process specific information to be sent to the XPU (or device). Embodiments described herein may provide a foundational infrastructure for hardware to send process specific information to the XPU and software to manage the process specific information stored at the XPU.

In the following description, various aspects of the illustrative implementations will be described using terms commonly employed by those skilled in the art to convey the substance of their work to others skilled in the art. However, it will be apparent to those skilled in the art that embodiments of the present disclosure may be practiced with only some of the described aspects. For purposes of explanation, specific numbers, materials, and configurations are set forth in order to provide a thorough understanding of the illustrative implementations. It will be apparent to one skilled in the art that embodiments of the present disclosure may be practiced without the specific details. In other instances, well-known features are omitted or simplified in order not to obscure the illustrative implementations.

In embodiments, a system-on-a-chip (SoC) may advertise that its input-output memory management unit (IOMMU) implements embodiments described herein. In addition, embodiments may be documented in architectural specifications of an IOMMU or other translation mechanism. In embodiments, a PCIe device may advertise the capability of various embodiments in its Configuration Space. In addition, programmable enabling and disabling of the structures and techniques described herein may occur, such that a system may dynamically enable and disable these features, as appropriate for a given use case and/or workload. For example, LAM provides software with additional security capability but it comes with associated performance overhead. When higher performance is more important than the additional security provided by LAM, software may choose not to enable LAM and hence DevPIC.

In the following detailed description, reference is made to the accompanying drawings that form a part hereof, wherein like numerals designate like parts throughout, and in which is shown by way of illustration embodiments in which the subject matter of the present disclosure may be practiced. It is to be understood that other embodiments may be utilized and structural or logical changes may be made without departing from the scope of the present disclosure. Therefore, the following detailed description is not to be taken in a limiting sense, and the scope of embodiments is defined by the appended claims and their equivalents.

For the purposes of the present disclosure, the phrase "A and/or B" means (A), (B), or (A and B). For the purposes of the present disclosure, the phrase "A, B, and/or C" means (A), (B), (C), (A and B), (A and C), (B and C), or (A, B, and C).

The description may use perspective-based descriptions such as top/bottom, in/out, over/under, and the like. Such descriptions are merely used to facilitate the discussion and are not intended to restrict the application of embodiments described herein to any particular orientation.

The description may use the phrases "in an embodiment," or "in embodiments," which may each refer to one or more of the same or different embodiments. Furthermore, the terms "comprising," "including," "having," and the like, as used with respect to embodiments of the present disclosure, are synonymous.

The term "coupled with," along with its derivatives, may be used herein. "Coupled" may mean one or more of the following. "Coupled" may mean that two or more elements are in direct physical or electrical contact. However, "coupled" may also mean that two or more elements indirectly contact each other, but yet still cooperate or interact with each other, and may mean that one or more other elements are coupled or connected between the elements that are said to be coupled with each other. The term "directly coupled" may mean that two or more elements are in direct contact.

As used herein, the term "module" may refer to, be part of, or include an Application Specific Integrated Circuit (ASIC), an electronic circuit, a processor (shared, dedicated, or group), and/or memory (shared, dedicated, or group) that execute one or more software or firmware programs, a combinational logic circuit, and/or other suitable components that provide the described functionality.

FIG. 1 is a diagram showing an example of LAM. Legacy CPUs check all virtual address bits (before address translation) to ensure that the address is canonical e.g., b63 . . . b56 (for a 5-level page-table system) have the same value (all 0s or all 1s). Modern software would like to embed some metadata in those canonical address bits as shown in FIG. 1. Each software process informs the CPU about a location of the metadata bits and the CPU masks off those bits before sending the address for address translation. The canonical check is still performed but only on the non-masked bit(s). In the case of FIG. 1, the canonical check is only performed on b63 and b56.

Thus FIG. 1 shows a portion of a processor to perform canonical checking of addresses. Specifically in FIG. 1, a processor 100 includes a canonical check circuit 105 to examine at least certain upper bits of an address to confirm that the address is canonical in form. As further shown in FIG. 1, in typical situations a linear or virtual address 110 includes an address portion that may be, e.g., 56 bits and an upper portion having a predetermined value of 0 (bits b56-b63). As used herein, the terms "linear," "logical" and "virtual" all refer to software-provided addresses, in contrast to actual physical addresses in a memory.

As further shown in FIG. 1, another linear address 120 may have linear address masking applied where metadata such as provided by a given software may be included in at least a portion of these upper address bits. Specifically as shown, linear address 120 includes metadata in upper address bits b62-b57. As shown, to perform a canonical check on address 120, only upper address bits 63 and 56 are applied to canonical check circuit 105.

For purposes of performing address translations, this metadata is not to be used. Accordingly, a mask 130, referred to herein as a LAM, may be used to mask off the metadata to form a transformed address 140 that may be provided to address translation circuitry. As seen, by way of this mask operation, all canonical bits (e.g., b63-b56) are set at the same value, logic 0, such that they may be used for address translation purposes.

Shared Virtual Memory (SVM)

Figure 2:
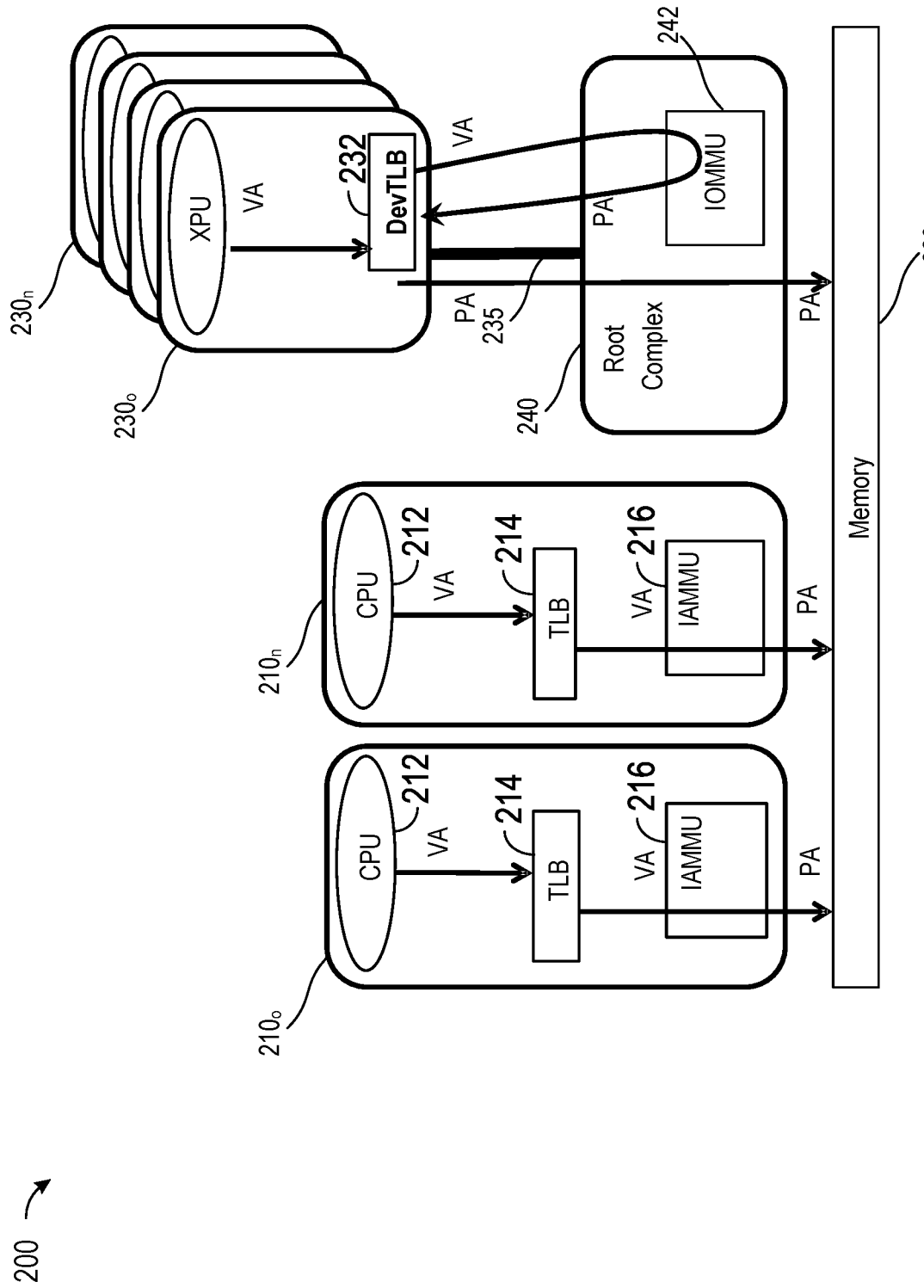
FIG. 2 is a diagram showing a shared virtual memory (SVM) and PCIe ATS, in accordance with various embodiments.

FIG. 2 is a diagram showing a shared virtual memory (SVM) and PCIe ATS, in accordance with various embodiments. Legacy computers are heterogenous systems that combine general purpose CPUs with specialized XPUs. Such systems are beginning to support SVM, where applications running on CPUs submit work to XPUs using virtual addresses, and expect that XPUs will be able to manipulate memory using virtual addresses just like the CPU. Using the page tables setup by Virtual Machines (VMs) and Virtual Machine Monitors (VMMs), memory management units (MMUs) translate Virtual Addresses (VA) into Physical Addresses (PA) for CPUs, and IOMMUs translate Virtual Addresses into Physical Addresses for XPUs as shown in FIG. 2. SVM allows CPUs and XPUs to manipulate complex data structures (e.g., trees) in memory without needless data copying. SVM also enables XPUs to handle page-faults, removing the requirement for XPUs to pin their memory, and thereby, for example, have a much larger working set size.

In the embodiment of FIG. 2, a computer system 200 may be any type of computing platform, ranging from small portable devices such as smartphones, tablet computers and so forth to larger devices such as client systems, e.g., desktop systems, server systems and so forth. As shown, system 200 includes a plurality of CPUs $210_0$-$210_n$. CPUs 210 communicate with a memory 220, which may be implemented as a SVM that is further shared with a set of devices $230_0$-$230_n$. Although shown generically in FIG. 2 as XPUs, understand that many different types of devices such as various PCIe or other such devices may be present in a given system. As further shown, a root complex 240 provides an interface between memory 220 and XPUs 230.

As illustrated in the high level of FIG. 2, CPUs 210 may include a processor complex (generally 212) which may include one or more cores or other processing engines. As seen, software that executes on these processing units may output VAs that may be provided to a translation lookaside buffer (TLB) 214. In general, TLBs 214 may buffer VA-to-PA addresses and potentially additional information. Such cache capability may be on behalf of a memory management unit (MMU) 216, which may include a greater set of address translations by way of a multi-level page table structure. In addition, MMU 216 may further include page miss handling circuitry to obtain address translations, e.g., from memory 220 when not present.

Similarly, root complex 240 includes another MMU, namely an IOMMU 242, that may store address translations on behalf of XPUs 230. Thus as shown, requests for translation may be received in root complex 240 from given XPUs 230 and in turn IOMMU 242 provides a physical address. Such translations may be stored in a TLB within XPU 230, namely a DevTLB 232. Then, with this physical address an XPU can send a memory request (e.g., read or write) to memory 220 with a given physical address. Note that in different implementations, root complex 240 may be a separate component or can be present in an SoC with a given one or more CPUs.

In different embodiments, an interconnect 235 that couples XPUs 230 to root complex 240 may provide communication according to one or more communication protocols such as PCIe, Compute Express Link (CXL) (such as a CXL.io protocol) or an integrated on-chip scalable fabric (IOSF), as examples.

One of the many challenges that legacy XPUs face when trying to take advantage of SVM is to build a PCIe ATS. ATS allows XPUs to request address translations from the IOMMU (aka Translation Agent-TA) and cache the results in a translation cache, DevTLB (aka address translation cache (ATC) or device TLB). DevTLB decouples the translation caching requirement of XPUs from the translation caches available in Root Complex IOMMU. SVM allows CPUs and XPUs to share a virtual memory.

LAM+SVM

Figure 3:
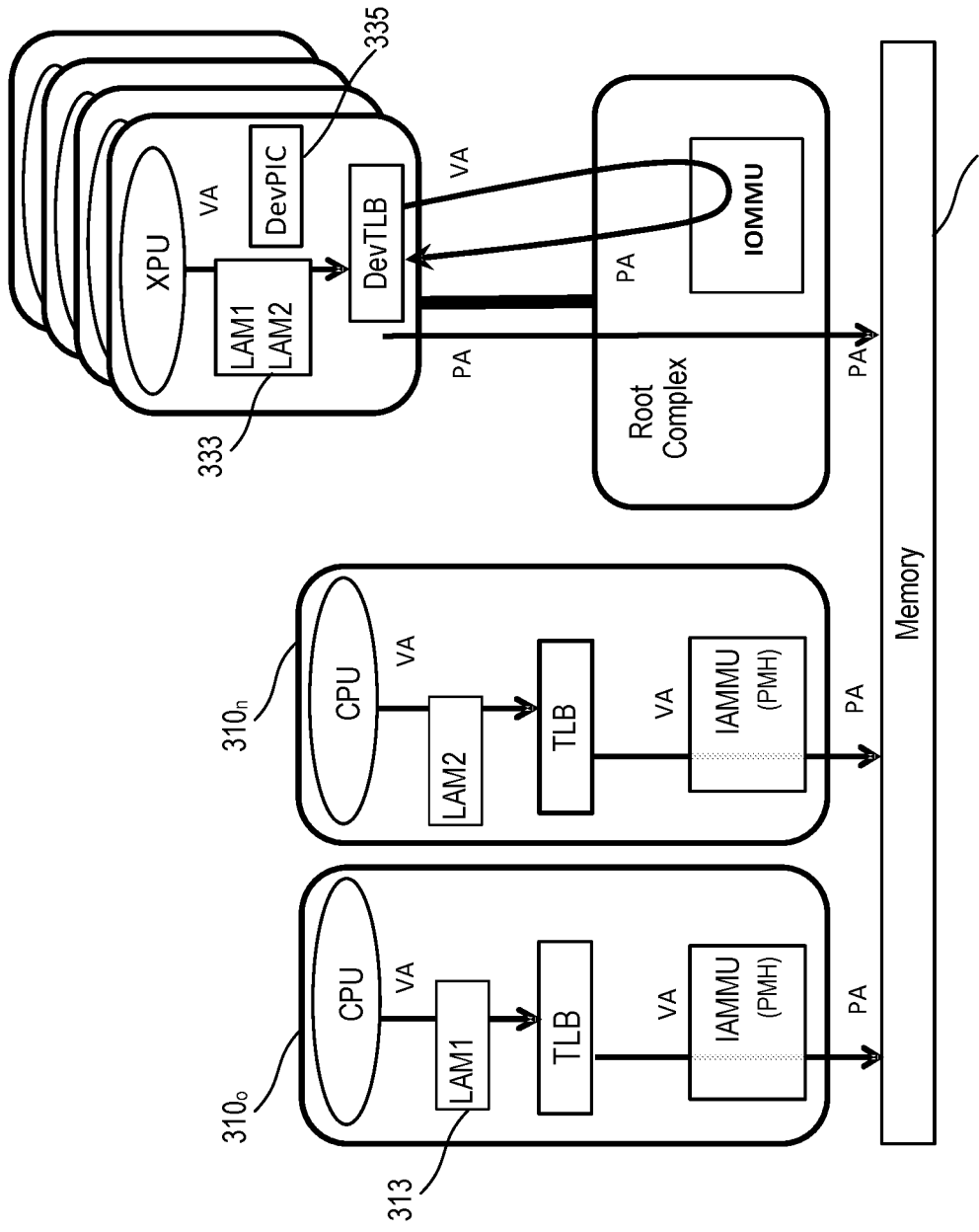
FIG. 3 is a diagram showing a combination of LAM and SVM, in accordance with various embodiments.

FIG. 3 is a diagram showing a combination of LAM and SVM, in accordance with various embodiments. CPUs continue to innovate and build technologies that change address manipulations/translations. Where XPUs share virtual memory with CPUs, there is an advantage to XPUs that implement embodiments described herein. In addition, one technology that is implemented on legacy CPUs is the LAM.

As described above, LAM allows applications to embed some metadata in upper address bits that were previously required to be either all 0s or all 1s. However, CPUs mask out the metadata information from those upper address bits as shown in FIG. 3, convert the address into a canonical form (e.g., all upper bits 0s or 1s) and then subject the address to address translation. In embodiments, because applications send an address with metadata to XPUs, the XPUs may also need to request information about the mask associated with the relevant CPU process from the IOMMU, and then may use that same mask to perform necessary metadata removal before performing address translation. Embodiments described herein may be directed to extending the PCIe ATS specification to allow XPUs to cache process specific information (e.g., a linear address mask).

Thus as shown in FIG. 3, a computer system 300 may generally take the same form as shown in FIG. 2 (and thus similar components have the same numbering as in FIG. 2, but with the "300" series). Here note the presence of mask circuitry 313 and 333. Such circuitry may perform logical operations between a mask such as a linear address mask as described herein and a linear address to obtain a linear address in correct canonical form to enable translations to be performed. In addition, XPUs 330 further include a cache memory to store process specific information, namely a device process information cache (DevPIC) 335 that stores the linear-address mask associated with a process and provides it to mask circuitry 313, 333. In other aspects, system 300 may be configured similarly to system 200 described above.

Device ProcessInfo Cache (DevPIC)

Figure 4:
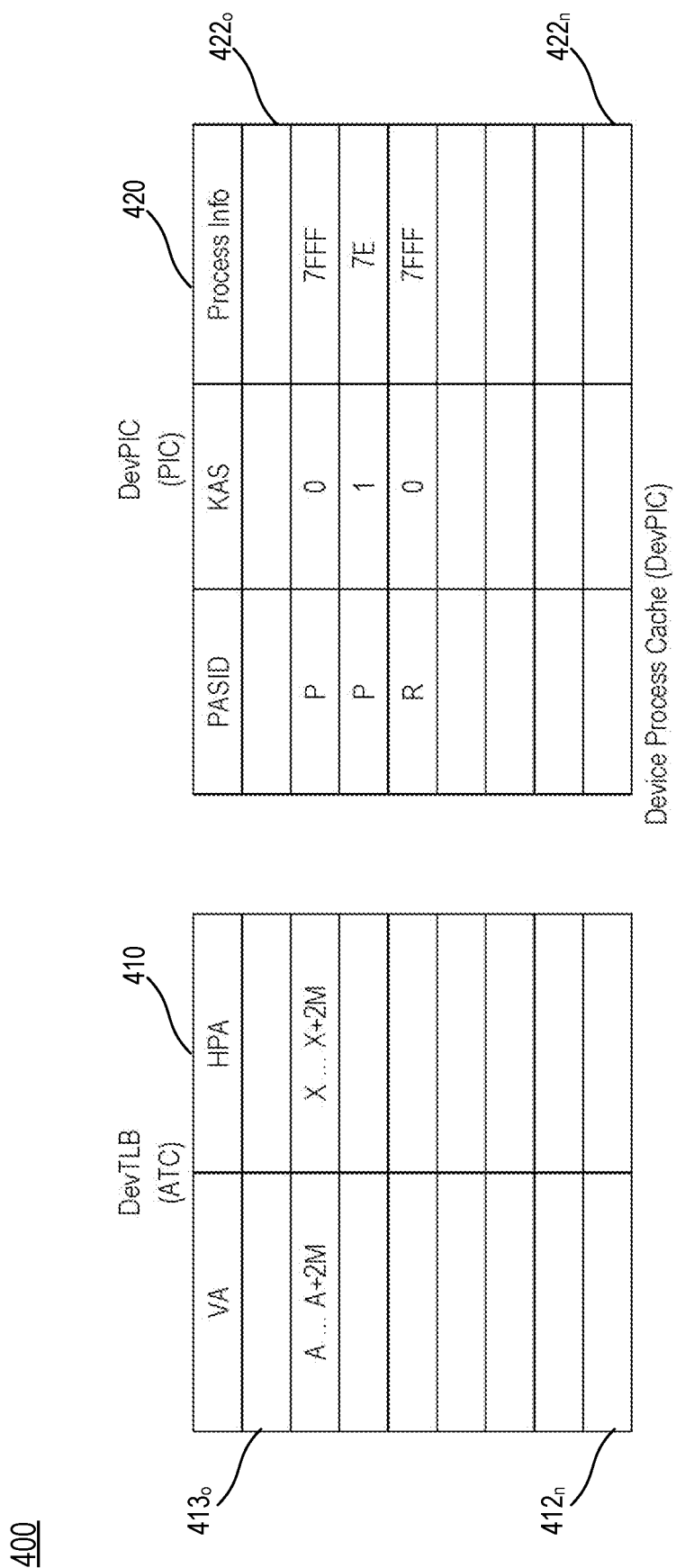
FIG. 4 is a diagram showing a Device Process Cache (DevPIC), in accordance with various embodiments.

FIG. 4 is a diagram showing a Device Process Cache (DevPIC), in accordance with various embodiments. PCIe ATS specification enables devices (e.g., XPUs) to embed a DeviceTLB (aka ATC). Embodiments described herein may include techniques where devices include a DevPIC to store process specific information. One embodiment could be as shown in FIG. 4. The device can use an ATS extension described with respect to FIG. 5 herein to fetch information about which virtual address bits to mask from the IOMMU and store them in a cache that is indexed by process-ID (PASID). Before the DevTLB can be looked up for address translation, the device obtains the address mask associated with the process and masks metadata bits from a virtual address provided by software. The masks used by a process to access user and kernel space may be different. An industrywide mechanism can be developed so that each platform can inform a device (e.g., by programming some registers in PCIe Configuration space) how the device can determine if an address is user or kernel space. One embodiment of such mechanism could be that system software informs the device to use b63 of the address to determine if it is an access to kernel address space (b63=1) or a user address space (b63=0). In embodiments this bit may be referred to as bit KAS (Kernel Address Space) and it may be used along with PASID to lookup the DevPIC.

The most simplistic implementation of a DevPIC can store an address mask as a raw bit-vector of N bits to support a variety of CPUs that may implement LAM in slightly different ways. In embodiments, that mask may be expressed as an encoded value using M bits (M=log 2(N)). For example, if CPUs support metadata bits in b62 . . . b48, then encoding maximum value of 15 only needs 4 bits of storage in DevPIC. In embodiments, DevPIC does not have to store the mask in the form it receives. If the industry converges to M possible masks, then the received information may still use a full expanded X-bit vector for future expandability but DevPIC can encode the Y possibilities using log 2(Y) bits and reduce storage requirement. Such DevPIC may become incompatible if the ATS specification is enhanced to support new masks. FIG. 4 shows an example of DevPIC in a system where b63 is used to identify User vs Kernel space, b62 . . . b48 or b62 . . . b57 may be used to contain metadata, and the mask is a 15 bit bit-vector.

In any event as shown in FIG. 4, a device 400 such as a given XPU or other PCIe peripheral device includes an address translation cache 410 having a plurality of entries 412$_0$-412$_n$. As seen, each entry 412 includes a field to store a VA and another field to store a host physical address (HPA). Note that although shown with this limited information, additional information may be stored in a device TLB, such as capability information including, in an embodiment, R-read allowed; W-write allowed; U-untranslated access only; Priv-privileged mode access; Exe-execute permitted; Global-global mapping; N-non-snooped access; S-size of translation.

Still with reference to FIG. 4, device 400 further includes a process information cache (PIC) 420. As illustrated, PIC 420 includes a plurality of entries 422$_0$-422$_n$. Each entry 422 may have fields to store information including a process address space identifier (PASID), a kernel/address space (KAS) indicator, and process information, which may be various types of process specific information relevant for a given usage case. In the example of FIG. 4, the PASID and KAS combination can be used to access a given piece of process specific information of an entry.

In the example shown in FIG. 4, this process information may be in the form of an address mask, e.g., a LAM as described herein. Understand that different or additional information (such as a domain ID or other process specific information) also may be stored in this or another field within the entries. Understand while shown at this high level of the embodiment of FIG. 4, many variations and alternatives are possible.

ATS Extension for DevPIC

Figure 5:
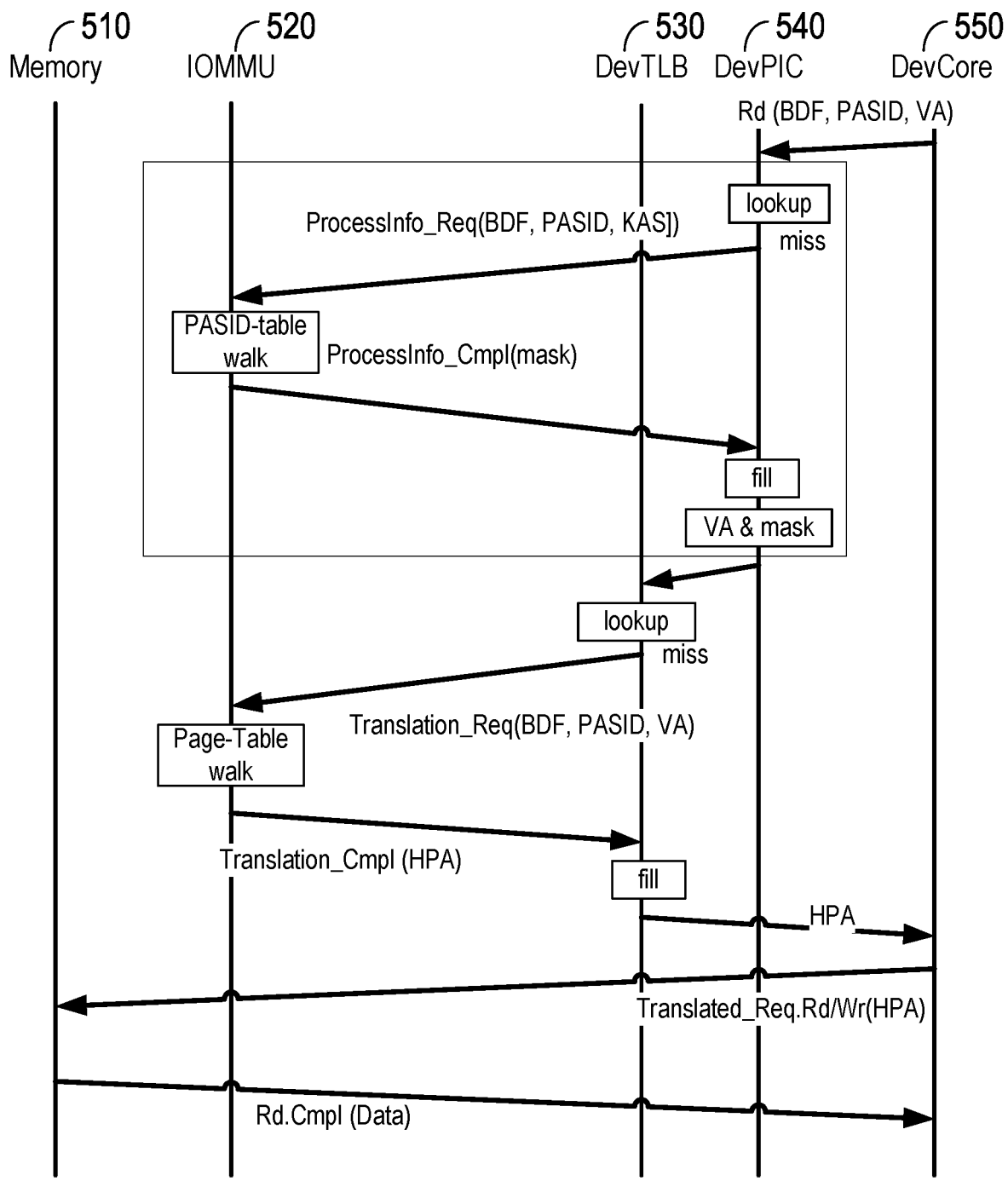
FIG. 5 is a diagram showing a process flow for ATS extensions, in accordance with various embodiments.

FIG. 5 is a diagram showing a process flow for ATS extensions, in accordance with various embodiments. Specifically, FIG. 5 shows interaction between various devices of a system 500, including a memory 510 which in an embodiment may be an SVM, an IOMMU 520, and components within a given device such as a PCIe device. In the embodiment shown, these components include a DevTLB 530, a DevPIC 540 and a DevCore 550, which may be a general-purpose processing core or any other processing engine of the device. In general, FIG. 5 shows various operations to obtain a host physical address (HPA) for a given virtual address, which it may then use for performing a memory access to memory 510.

In general, a device uses a translation request (Translation_Req) to fetch a VA-to-host physical address (HPA) mapping from IOMMU and store the result in DevTLB. In embodiments, when software changes the mapping, it may be expected to issue a DevTLB invalidation to each device that may have stale mapping. Embodiments may include similar extensions for supporting the DevPIC. For every memory access, the device first looks at DevPIC using, e.g., bus device function (BDF), PASID and KAS, and tries to find the mask associated with the process so that it can apply the mask to the VA. On a DevPIC miss, the device issues a request, ProcessInfo_Req, towards the IOMMU, which carries BDF, PASID and KAS. The IOMMU uses information in the ProcessInfo_Req to index into information provided by system software (in memory or registers) to determine which bits of VA should be masked-off and provides the mask back to the device in a completion, ProcessInfo_Cmpl.

The device caches the mask in DevPIC as described with respect to FIG. 4. In embodiments, the device uses the mask to remove metadata bits from VA and then may use the sanitized VA to lookup the DevTLB. After this point device may behave exactly as it does with traditional ATS. Note that in embodiments ProcessInfo_Req is issued only on a DevPIC miss, which typically only happens on the first memory access by device on behalf of a new process. Once DevPIC is filled, and if the entry is not evicted due to capacity constraints, all subsequent memory accesses by device for the process will hit in DevPIC and will not suffer the overhead of ProcessInfo_Req. Thus, with an appropriately sized DevPIC, little performance overhead may result from these extensions to the ATS protocol.

Figure 6:
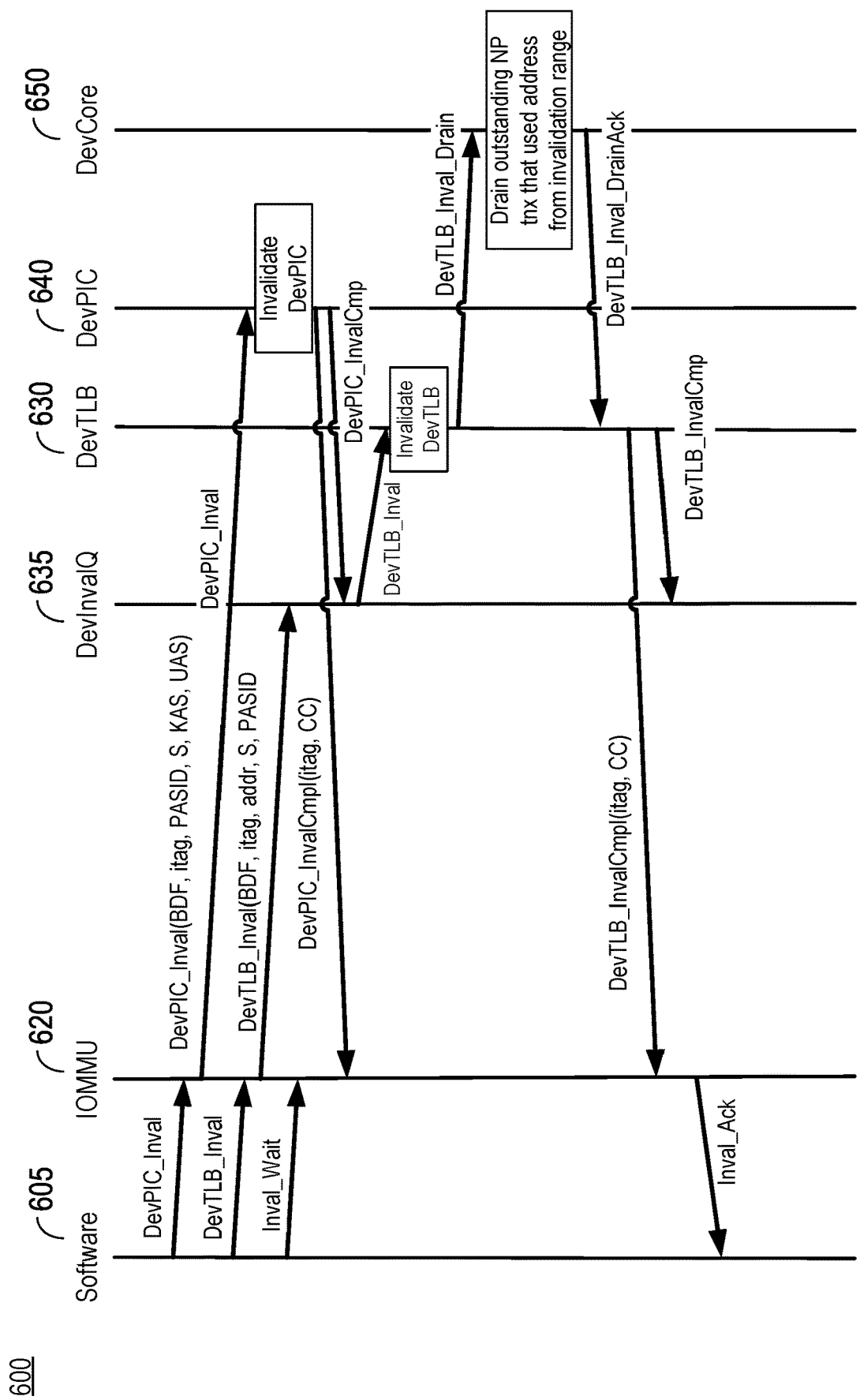
FIG. 6 is a diagram showing a process for DevPIC Invalidation, in accordance with various embodiments.

FIG. 6 is a diagram showing a process for DevPIC invalidation, in accordance with various embodiments. When software changes the location of metadata bits for a process, it removes stale information cached in DevPIC by issuing an invalidation command to DevPIC. When a location of metadata bits for a process changes, all the entries cached in DevTLB for that process may also become unusable and software may issue a traditional DevTLB invalidation to invalidate DevTLB. To get confirmation that DevTLB has invalidated stale information, legacy software also issues an Invalidation_Wait command to IOMMU and waits for confirmation (update of some flag in memory or interrupt) from IOMMU. Since in this case DevPIC invalidation is always followed by DevTLB invalidation, and because DevTLB invalidation today results in draining of outstanding stale transactions, in embodiments there is no reason for DevPIC invalidation completion to drain any outstanding non-posted (NP) transactions. Extensions to invalidation protocol for DevPIC are highlighted in FIG. 6.

In embodiments, DevPIC invalidation message may carry the following pieces of information: (1) BDF: which may be the same as legacy DevTLB invalidation; (2) Itag: which may be the same as legacy DevTLB invalidation; (3) PASID: which may be the same as legacy DevTLB invalidation; (4) S (Size): DevTLB invalidation allows invalidation of a contiguous region of address, the S-bit indicates that multiple contiguous PASIDs should be invalidated using a single invalidation command; (5) KAS: Invalidate ProcessInfo entry associated with Kernel Address Space; and/or (7) UAS: Invalidate ProcessInfo entry associated with User Address Space. Note: If KAS=UAS=0, the device treats the invalidation as a Nop and without performing any invalidation of DevPIC should issue DevPIC_InvalCmpl.

Although DevPIC may be used to store address-mask, there can be other process specific information that may be cached in DevPIC. Such information may also be used to tag DevTLB entries. Thus, in embodiments, devices complete a DevPIC invalidation before starting a following DevTLB invalidation. Devices also ensure that DevTLB invalidation completion for a given DevTLB invalidation pushes all the DevPIC invalidation completions that were issued by DevPIC Invalidations ahead of the DevTLB invalidation.

Software Sequence to Change LAM Associated With a Process

In various embodiments, software performs the following steps before it can change the metadata bit location associated with a process:

i) If the process is running on CPU and/or XPU, the process is quiesced, e.g., the process is not able to submit any new work to CPU and/or XPU.

ii) An interface that will allow software to query XPUs that all requests from a specific process have been pushed to ordered domain. Such request may not have reached global observation point.

iii) Software may issue an invalidation to IOMMU to invalidate caches that store ProcessInfo (for Intel VT-d architecture such cache is known as PASID-cache).

iv) Software may issue an DevPIC invalidation to all devices that may have run the process.

v) Software may issue an invalidation to IOMMU to invalidate TLBs that store translation for the process.

vi) Software may issue an DevTLB invalidation to all devices that may have run the process.

vii) Software may request confirmation from IOMMU that all outstanding DevTLB invalidations have completed.

viii) After this sequence of operation, software may have the guarantee that all transaction from the process that has been quiesced have reached global observation.

ix) Software can now change location of metadata bits and then restart the process.

Other Usage for DevPIC

Figure 7:
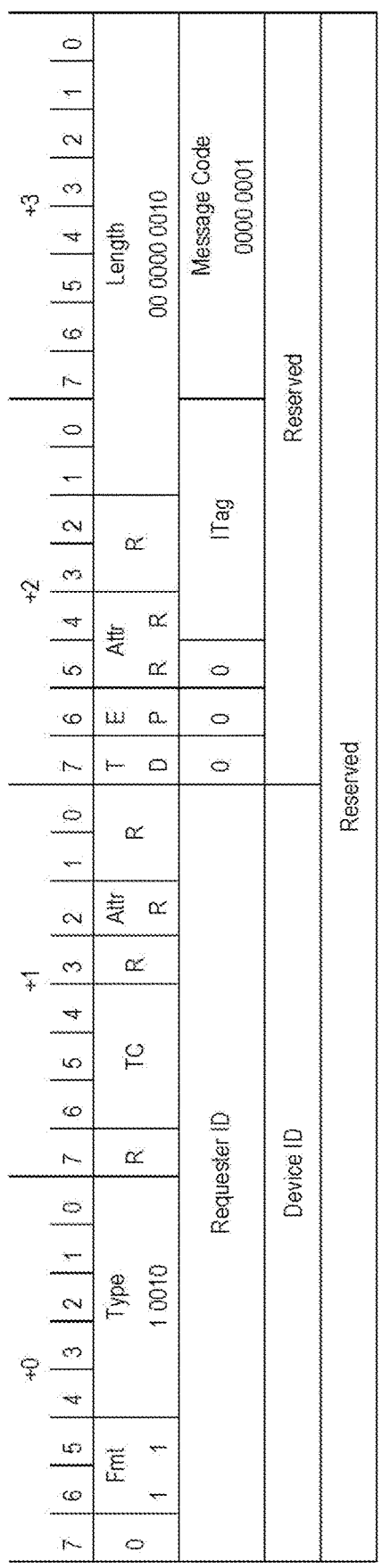
FIG. 7 is a diagram showing an example of an Invalidate Request Message, in accordance with various embodiments.
Figure 8:
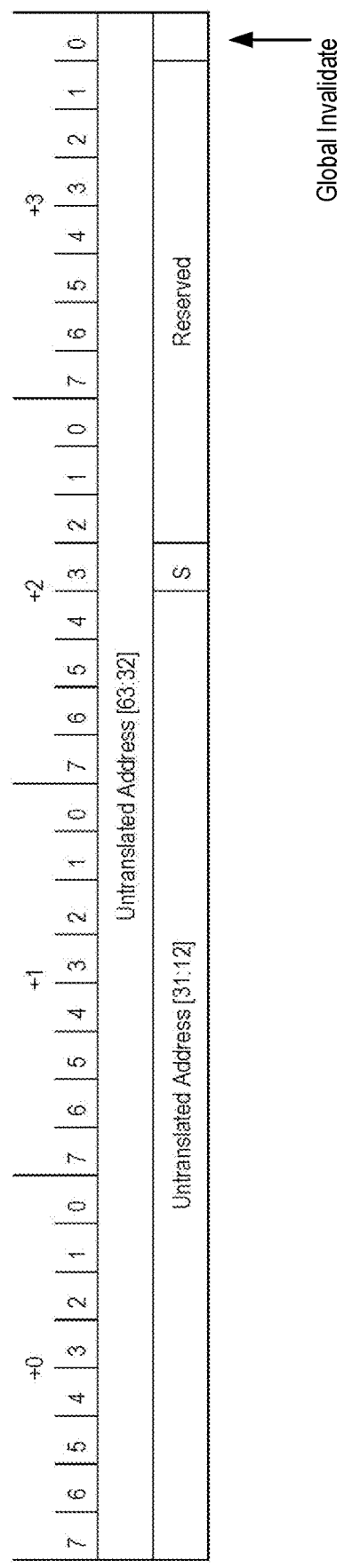
FIG. 8 is a diagram showing an example of an Invalidate Request Message Body, in accordance with various embodiments.

A DevTLB invalidation request may include a message and a payload (e.g., 64-bit payload). FIG. 7 is a diagram showing an example of an Invalidate Request Message, in accordance with various embodiments. In general, message 700 includes a format according to a given PCIe specification, including various header fields, requester and device identifiers and so forth. FIG. 8 is a diagram showing an example of an Invalidate Request Message Body, in accordance with various embodiments. As shown in FIG. 8, message body 800 may include 64 bits and may include an untranslated address, and an S-bit to identify a size. Further as shown, a global invalidate bit, when set, causes pages matching the untranslated address (or pages in the region starting at untranslated address, if S-bit is set) to be invalidated for all PASIDs. Note that in some embodiments, when this bit is zero, only translations that match the untranslated address and the specific PASID (provided in PASID TLP Prefix attached to the invalidation message) may be invalidated As mentioned earlier, in embodiments the use of DevPIC is not limited to storing address-mask for LAM. It is generic infrastructure that can be used to store any process specific information. Another example is to store a Domain-ID (VM-ID) that identifies a VM in the DevPIC. When IOMMU receives ProcessInfo_Req in addition to mask it also provides the Domain-ID to the DevPIC. On a DevPIC hit, the device will obtain the Domain-ID and store it in the buffer that is waiting to receive a Translation_Cmpl. When the Translation_Cmpl arrives from IOMMU, the device can fill into DevTLB the translated address and the Domain-ID. The definition of DevTLB in PCIe-ATS specification may include storing of Domain-ID.

Today invalidating DevTLB entries from N different PASID from a single Domain requires software to issue N independent invalidations, which increases latency of invalidation and slows down system software's ability to map/unmap buffers and manage system memory. The benefit of storing Domain-ID in each DevTLB entry is that it allows software to invalidate all DevTLB entries that belong to a certain Domain with a single invalidation request. The DevTLB invalidation request includes a Message and 64 bit Payload as shown in FIGS. 7 and 8. The Domain-ID field can be an arbitrary width and vary across products and platforms. It may be at least 16 bit and it may be set at an upper limit to 32 bit (PCIe SIG can choose to limit the maximum number of bits supported via Domain-ID). The additional Domain-ID bits can be added to Invalidate Request Message shown in FIG. 8 in the currently Reserved bits or the Invalidate Request Message Body can be expanded from current 64 bits to 96 bits. One additional bit may specify that the Domain-ID field is present and valid.

In embodiments, for DevTLB invalidations without PASID-TLP Prefix the Domain-ID and Domain-ID-Present field can be used as follows:
  i) Domain-ID-Present=0=>Invalidate DevTLB entries that match address range (same as today)
  ii) Domain-ID-Present=1=>Invalidate DevTLB entries that match address range and Domain-ID.

In embodiments, for DevTLB invalidations with PASID-TLP Prefix the Domain-ID and Domain-ID-Present field can be used as follows:
  i) Domain-ID-Present=0=>Invalidate DevTLB entries with specified PASID that match address range.
  ii) Domain-ID-Present=1=>Invalidate DevTLB entries with specified PASID that match address range and the Domain-ID.

Other embodiments of supporting Domain-ID in Invalidation protocol is to store Domain-ID in DevPIC but not in DevTLB. In this approach when the DevTLB invalidation arrives with Domain-ID, the device will have to search through DevPIC to find all PASIDs associated with Domain-ID and then perform multiple PASID-based DevTLB invalidations.

Other embodiments may allow Domain-ID to be sent to and stored in DevTLB without requiring storage of Domain-ID in DevPIC. Instead of sending Domain-ID in ProcessInfo_Cmp, IOMMUs can choose send Domain-ID in Translation_Cmp. However, since Translation_Req are expected to be an order of magnitude (or more) more frequent than ProcessInfo_Req it would be inefficient to send extra Domain-ID bits on each one.

Figure 9:
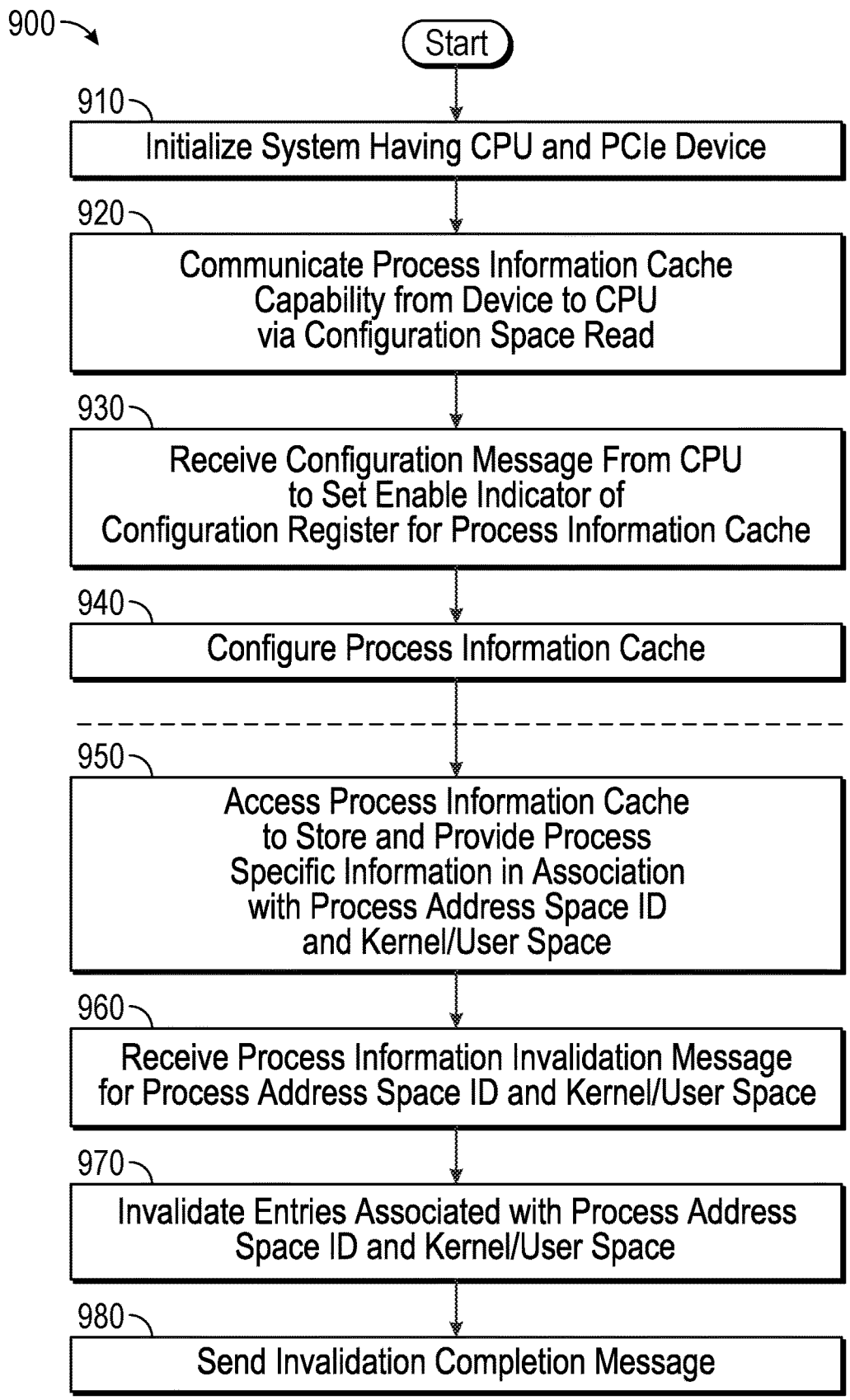
FIG. 9 is a flow diagram of a method in accordance with an embodiment.

Referring now to FIG. 9, shown is a flow diagram of a method in accordance with an embodiment. More specifically, method 900 shows operations performed in initializing a computing system having one or more devices with a DevPIC as described herein, and normal operation of a system in which this DevPIC is used to store and provide process specific information. As such, method 900 may be performed by various hardware circuitry within a device, alone or in combination with firmware and/or software.

As illustrated, method 900 begins by initializing a system having at least one CPU and at least one attached device such as a PCIe device (block 910). Such initialization operations may occur conventionally in which various firmware is loaded to the different devices. Control next passes to block 920 where in response to a configuration space read from the CPU, the device may communicate capability information such as present in one or more capabilities and/or configuration registers or other storages. This communication may be via a CPU read of the device's configuration space.

In a particular embodiment, information regarding presence of a PIC may be stored in an extended capability structure of the device such as a standalone PIC extended capability structure. In another embodiment, information regarding a PIC may be included within a PCIe ATS extended capability structure.

Next at block 930 a configuration message may be received from the CPU, e.g., to write an enable indicator of this configuration storage to enable the PIC. Note that similar operations may be performed to provide further capability information and receive enabling of other components, such as a DevTLB as described herein. At this point (block 940), the PIC may be configured, e.g., by enabling it via a controller of the device. Thus the device with active PIC is ready for use in normal operation.

Still with reference to FIG. 9, during normal operation the PIC may be accessed (block 950). More specifically, received process specific information may be stored within entries of the PIC in association with a given PASID and a corresponding kernel/user space indicator. As such, each entry of the PIC may be associated with a given process and address space (e.g., user or kernel space), which may be used to look up an entry storing the process specific information. Still with reference to FIG. 9, next at block 960 a process information invalidation message may be received for a given PASID and kernel/user address space. In response to this invalidation message, at block 970 the PIC may invalidate entries associated with the particular PASID and kernel/user space. Note that a separate DevTLB invalidation command may be sent to invalidate the DevTLB. In other cases, a DevPIC invalidation message may trigger an invalidation of both DevPIC and DevTLB. Upon invalidation, control passes to block 980 where an invalidation completion message may be sent back to the requester. Understand while shown at this high level in the embodiment of FIG. 9, many variations and alternatives are possible.

Additional DevPIC Enhancements

Embodiments include various process specific information that can be cached on the device side and how it can be kept consistent with system software structures that maintain and change such process specific information. However, embodiments described herein are not limited to these usages. Embodiments described herein may be directed to building infrastructure that allows caching (and also invalidating) any process specific information that may exist today or that is created in future.

Figure 10:
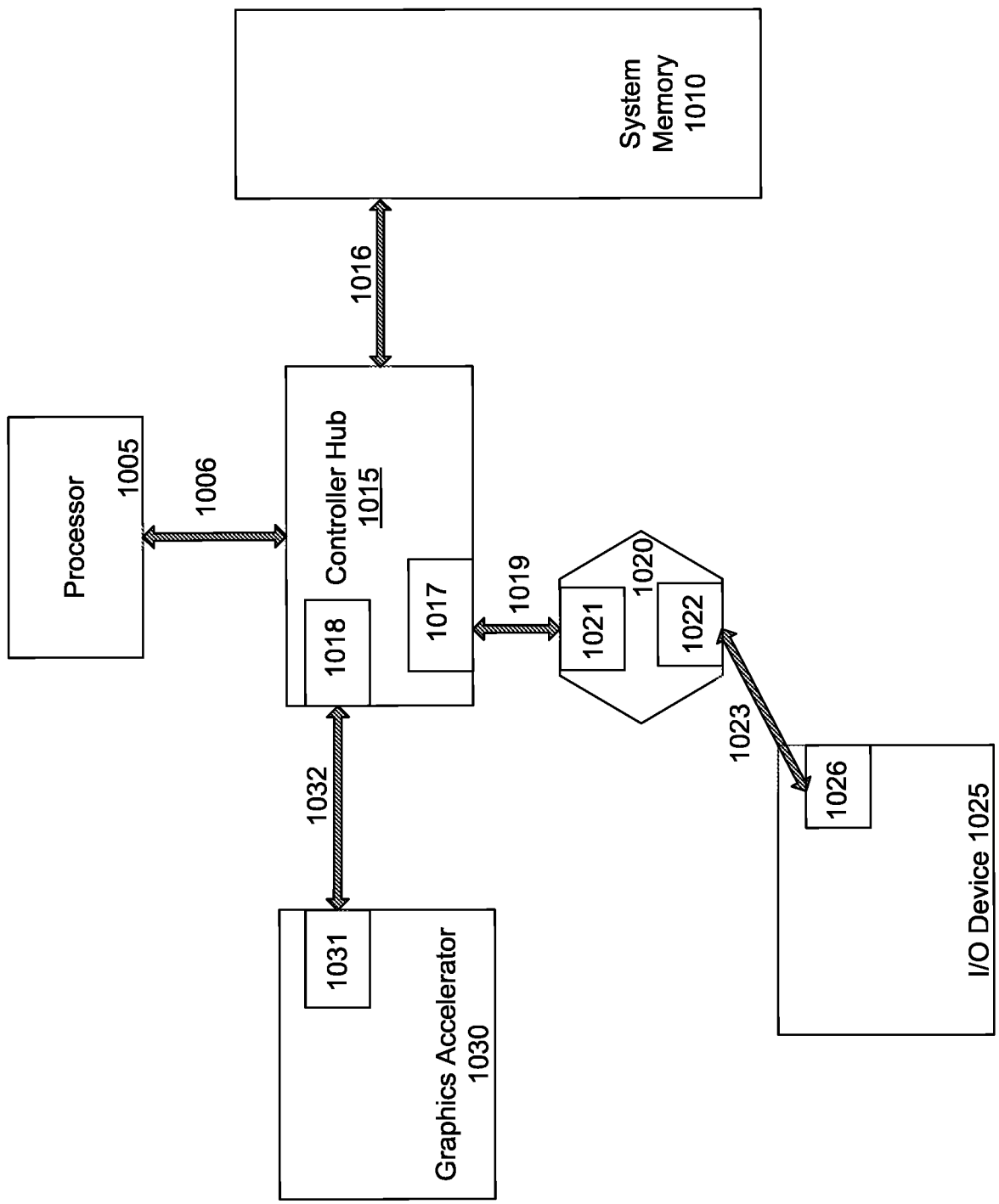
FIG. 10 is an embodiment of a fabric composed of point-to-point links that interconnect a set of components.

Embodiments may be implemented in a wide variety of interconnect structures. Referring to FIG. 10, an embodiment of a fabric composed of point-to-point links that interconnect a set of components is illustrated. System 1000 includes processor 1005 and a flash memory 1010 coupled to controller hub 1015. Processor 1005 includes any processing element, such as a microprocessor, a host processor, an embedded processor, a co-processor, or other processor. Processor 1005 is coupled to controller hub 1015 through front-side bus (FSB) 1006. In one embodiment, FSB 1006 is a serial point-to-point interconnect.

System memory 1010 includes any memory device, such as random access memory (RAM), non-volatile (NV) memory, or other memory accessible by devices in system 1000.

As shown, system memory 1010 is coupled to controller hub 1015 through memory interface 1016. Examples of a memory interface include a double-data rate (DDR) memory interface, a dual-channel DDR memory interface, a dynamic RAM (DRAM), and/or a SPI memory interface.

In one embodiment, controller hub 1015 is a root hub, root complex, or root controller in a PCIe interconnection hierarchy. Examples of controller hub 1015 include a chipset, a memory controller hub (MCH), a northbridge, an interconnect controller hub (ICH), a southbridge or peripheral controller hub (PCH), and a root controller/hub. Often the term chipset refers to two physically separate controller hubs, i.e. a memory controller hub (MCH) coupled to an interconnect controller hub (ICH). Note that current systems often include the MCH integrated with processor 1005, while controller 1015 is to communicate with I/O devices, in a similar manner as described below. In some embodiments, peer-to-peer routing is optionally supported through root complex 1015. Root complex 1015 may include an IOMMU that, in a SVM model, enables a graphics accelerator 1030 and/or a device 1025 (which may include DevPICs in accordance with an embodiment) to access a common memory space with processor 1005.

Controller hub 1015 is coupled to switch/bridge 1020 through serial link 1019. Input/output modules 1017 and 1021, which may also be referred to as interfaces/ports 1017 and 1021, include/implement a layered protocol stack to provide communication between controller hub 1015 and switch 1020. In one embodiment, multiple devices are capable of being coupled to switch 1020.

Switch/bridge 1020 routes packets/messages from device 1025 upstream, i.e., up a hierarchy towards a root complex, to controller hub 1015 and downstream, i.e., down a hierarchy away from a root controller, from processor 1005 or system memory 1010 to device 1025. Switch 1020, in one embodiment, is referred to as a logical assembly of multiple virtual PCI-to-PCI bridge devices. Device 1025 includes any internal or external device or component to be coupled to an electronic system, such as an I/O device, a Network Interface Controller (NIC), an add-in card, an audio processor, a network processor, a hard-drive, a storage device, a CD/DVD ROM, a monitor, a printer, a mouse, a keyboard, a router, a portable storage device, a Firewire device, a Universal Serial Bus (USB) device, a scanner, and other input/output devices. Often in the PCIe vernacular, such a device is referred to as an endpoint. Although not specifically shown, device 1025 may include a PCIe to PCI/PCI-X bridge to support legacy or other version PCI devices. Endpoint devices in PCIe are often classified as legacy, PCIe, or root complex integrated endpoints.

Graphics accelerator 1030 is also coupled to controller hub 1015 through serial link 1032. In one embodiment, graphics accelerator 1030 is coupled to an MCH, which is coupled to an ICH. Switch 1020, and accordingly I/O device 1025, is then coupled to the ICH. I/O modules 1031 and 1018 are also to implement a layered protocol stack to communicate between graphics accelerator 1030 and controller hub 1015. A graphics controller or the graphics accelerator 1030 itself may be integrated in processor 1005.

Figure 11:
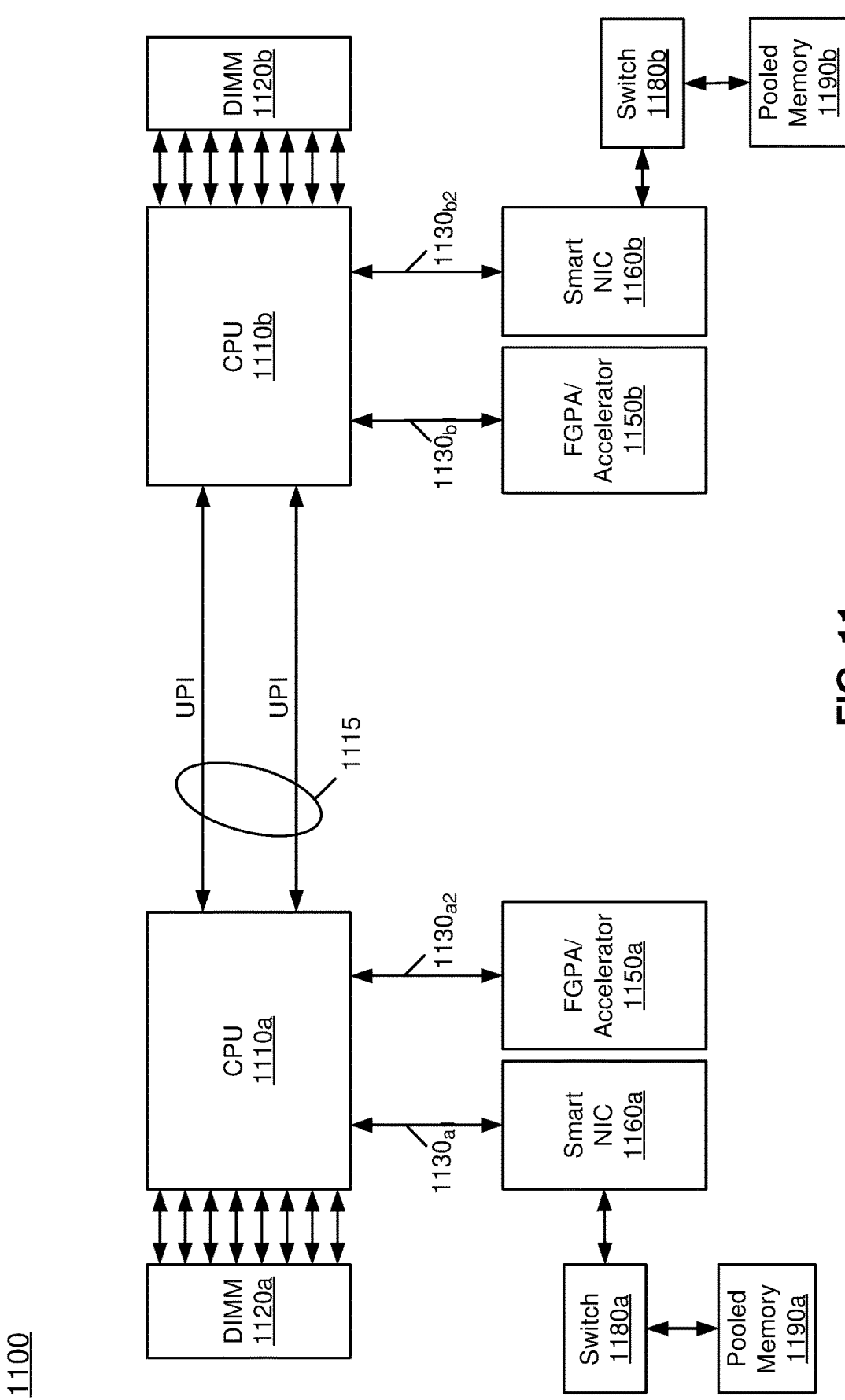
FIG. 11 is a block diagram of a system in accordance with another embodiment of the present invention.

Referring now to FIG. 11, shown is a block diagram of a system in accordance with another embodiment of the present invention. As shown in FIG. 11, a system 1100 may be any type of computing device, and in one embodiment may be a server system. In the embodiment of FIG. 11, system 1100 includes multiple CPUs 1110a,b that in turn couple to respective system memories 1120a,b which in embodiments may be implemented as DIMMs such as double data rate (DDR) memory, persistent or other types of memory. Note that CPUs 1110 may couple together via an interconnect system 1115 such as an Intel® Ultra Path Interconnect or other processor interconnect technology.

To enable coherent accelerator devices and/or smart adapter devices to couple to CPUs 1110 by way of potentially multiple communication protocols, a plurality of interconnects 1130a1-b2 may be present. In an embodiment, each interconnect 1130 may be a given instance of a Compute Express Link (CXL) in which PCIe communications, including ATS communications may occur.

In the embodiment shown, respective CPUs 1110 couple to corresponding field programmable gate arrays (FPGAs)/accelerator devices 1150a,b (which may include GPUs or other accelerators may include DevPICs in accordance with an embodiment. In addition CPUs 1110 also couple to smart NIC devices 1160a,b. In turn, smart NIC devices 1160a,b couple to switches 1180a,b that in turn couple to a pooled memory 1190a,b such as a persistent memory. Of course, embodiments are not limited to accelerators 1150 and the techniques and structures described herein may be implemented in other entities of a system.

Figure 12:
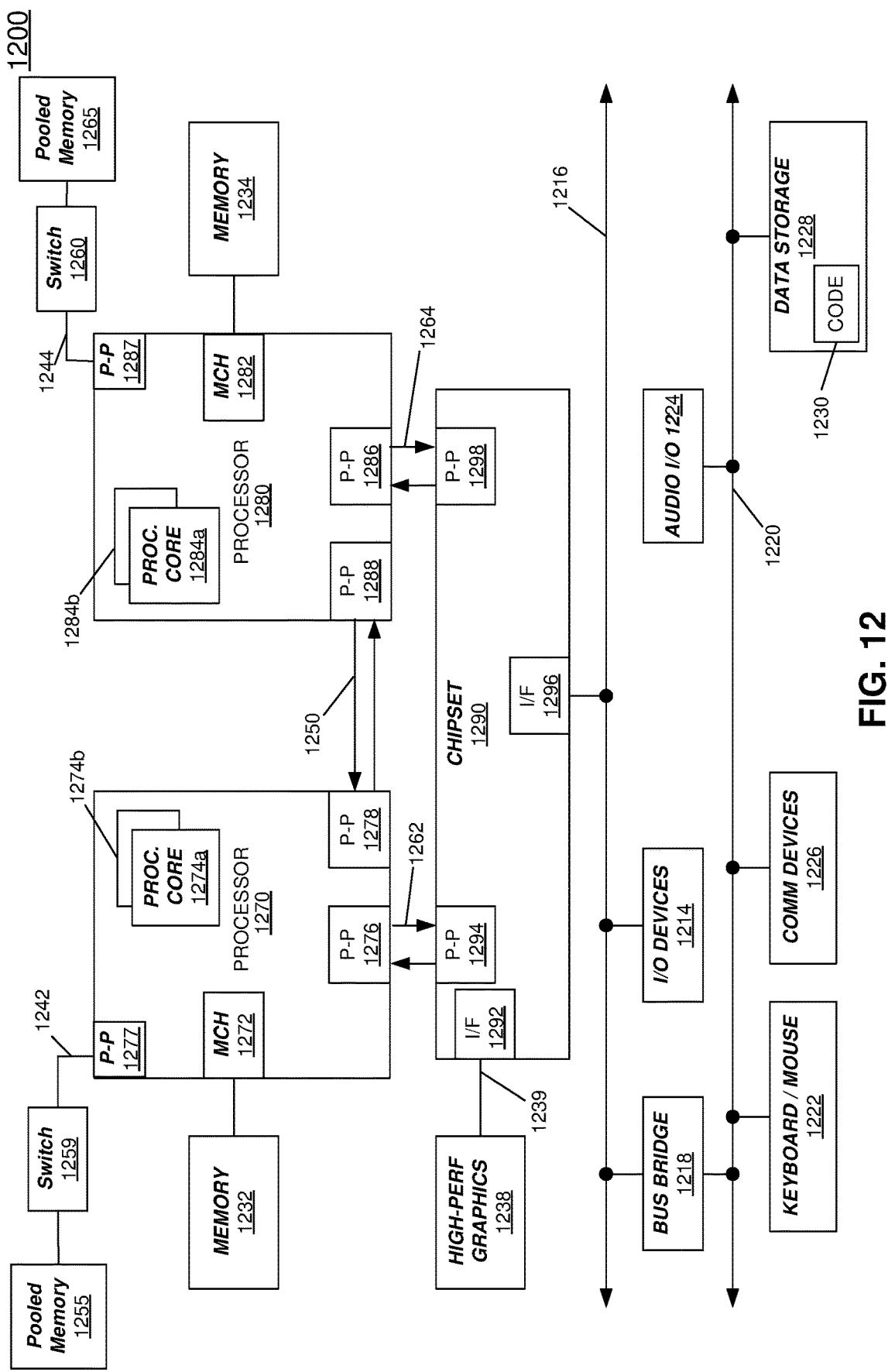
FIG. 12 is a block diagram of a system in accordance with another embodiment of the present invention.

Referring now to FIG. 12, shown is a block diagram of a system in accordance with another embodiment such as a data center platform. As shown in FIG. 12, multiprocessor system 1200 includes a first processor 1270 and a second processor 1280 coupled via a point-to-point interconnect 1250. As shown in FIG. 12, each of processors 1270 and 1280 may be many core processors including representative first and second processor cores (i.e., processor cores 1274a and 1274b and processor cores 1284a and 1284b).

In the embodiment of FIG. 12, processors 1270 and 1280 further include point-to point interconnects 1277 and 1287, which couple via interconnects 1242 and 1244 (which may be CXL buses through which PCIe communications pass) to switches 1259 and 1260, which may include IOMMUs to enable devices having DevPICs to access pooled memories 1255 and 1265.

Still referring to FIG. 12, first processor 1270 further includes a memory controller hub (MCH) 1272 and point-to-point (P-P) interfaces 1276 and 1278. Similarly, second processor 1280 includes a MCH 1282 and P-P interfaces 1286 and 1288. As shown in FIG. 12, MCH's 1272 and 1282 couple the processors to respective memories, namely a memory 1232 and a memory 1234, which may be portions of system memory (e.g., DRAM) locally attached to the respective processors. First processor 1270 and second processor 1280 may be coupled to a chipset 1290 via P-P interconnects 1276 and 1286, respectively. As shown in FIG. 12, chipset 1290 includes P-P interfaces 1294 and 1298.

Furthermore, chipset 1290 includes an interface 1292 to couple chipset 1290 with a high performance graphics engine 1238, by a P-P interconnect 1239. As shown in FIG. 12, various input/output (I/O) devices 1214 may be coupled to first bus 1216, along with a bus bridge 1218 which couples first bus 1216 to a second bus 1220. Various devices may be coupled to second bus 1220 including, for example, a keyboard/mouse 1222, communication devices 1226 and a data storage unit 1228 such as a disk drive or other mass storage device which may include code 1230, in one embodiment. Further, an audio I/O 1224 may be coupled to second bus 1220.

Various embodiments may include any suitable combination of the above-described embodiments including alternative (or) embodiments of embodiments that are described in conjunctive form (and) above (e.g., the "and" may be "and/or"). Furthermore, some embodiments may include one or more articles of manufacture (e.g., non-transitory computer-readable media) having instructions, stored thereon, that when executed result in actions of any of the above-described embodiments. Moreover, some embodiments may include apparatuses or systems having any suitable means for carrying out the various operations of the above-described embodiments.

The above description of illustrated embodiments, including what is described in the Abstract, is not intended to be exhaustive or to limit embodiments to the precise forms disclosed. While specific embodiments are described herein for illustrative purposes, various equivalent modifications are possible within the scope of the embodiments, as those skilled in the relevant art will recognize.

These modifications may be made to the embodiments in light of the above detailed description. The terms used in the following claims should not be construed to limit the embodiments to the specific implementations disclosed in the specification and the claims. Rather, the scope of the invention is to be determined entirely by the following claims, which are to be construed in accordance with established doctrines of claim interpretation.

EXAMPLES

The following examples pertain to further embodiments.

Example 1 may be an apparatus, comprising: a Device ProcessInfo Cache (DevPIC); a Device Translation Lookaside Buffer (DevTLB); one or more processors coupled with the DevPIC and the DevTLB; memory coupled with the one or more processors, the memory to store instructions that, upon execution, cause the one or more processors to: receive a request to perform a read; identify virtual address bits for masking; and transmit a request to the DevTLB based upon the virtual address bits for masking and the read request.

Example 2 may include the apparatus of example 1, wherein the DevPIC includes process specific information.

Example 3 may include the apparatus of example 2, wherein the process specific information includes virtual address bits to mask from an input-output memory management unit (IOMMU).

Example 4 may include the apparatus of example 2, wherein the process specific information in the DevPIC is fetched using address translation services (ATS) extensions.

Example Z01 may include an apparatus comprising means to perform one or more elements of a method described in or related to any of examples herein, or any other method or process described herein.

Example Z02 may include one or more non-transitory computer-readable media comprising instructions to cause an electronic device, upon execution of the instructions by one or more processors of the electronic device, to perform one or more elements of a method described in or related to any of examples herein, or any other method or process described herein.

Example Z03 may include an apparatus comprising logic, modules, or circuitry to perform one or more elements of a method described in or related to any of examples herein, or any other method or process described herein.

Example Z04 may include a method, technique, or process as described in or related to any of examples herein, or portions or parts thereof.

Example Z05 may include an apparatus comprising: one or more processors and one or more computer readable media comprising instructions that, when executed by the one or more processors, cause the one or more processors to perform the method, techniques, or process as described in or related to any of examples herein, or portions thereof.

Example Z06 may include a signal as described in or related to any of examples herein, or portions or parts thereof.

In one example, an apparatus comprises: a cache memory having a plurality of entries, each of the plurality of entries to store process specific information for a process; a DevTLB having a plurality of entries each to store a virtual address-to-physical address translation received from an IOMMU; and at least one processor coupled to the cache memory and the DevTLB.

In an example, the apparatus comprises a PCIe device to couple with at least one CPU and a SVM.

In an example, the process specific information includes mask information to indicate one or more address bits of a virtual address to be masked from the IOMMU.

In an example, the apparatus further comprises a mask circuit to receive a virtual address from the at least one processor and to mask one or more address bits of the virtual address according to the process specific information from an entry of the cache memory, where the masked one or more address bits of the virtual address comprises metadata associated with a process.

In an example, the apparatus is to receive a physical address from the IOMMU in response to the masked virtual address, the apparatus to send the physical address to the SVM, the PCIe device coupled to the SVM via a root complex, the root complex comprising the IOMMU.

In an example, each of the plurality of entries of the cache memory comprises: a first field to store a process address space identifier; a second field to store portion of an address space; and a third field to store the process specific information.

In an example, the second field is to store the portion of the address space to identify whether the entry is associated with a kernel space of the process or a user space of the process.

In an example, the process specific information comprises a domain identifier.

In an example, in response to an invalidation message for a first process having a first domain identifier, the DevTLB is to invalidate entries of the DevTLB associated with the first domain identifier.

In an example, the apparatus further comprises a configuration storage to store configuration information, the configuration information comprising an indicator to indicate presence of the cache memory.

In another example, a method comprises: communicating, from a PCIe device to a processor, capability information of the PCIe device, the capability information to indicate that the PCIe device includes a process information cache to store process specific information; receiving a configuration message from the processor and enabling the process information cache, in response to the configuration message; receiving first process specific information from an IOMMU; and storing the first process specific information in a first entry of the process information cache in association with a PASID.

In an example, the method further comprises storing the first process specific information in the first entry of the process information cache in association with one of a kernel address space or a user address space.

In an example, the method further comprises receiving the first process specific information in response to a request from the process information cache to the IOMMU.

In an example, the method further comprises sending the request to the IOMMU in response to a read request to a first virtual address from a processing circuit of the PCIe device.

In an example, the method further comprises: using a mask included in the process specific information to mask at least a portion of the first virtual address; and sending the masked first virtual address to a device translation lookaside buffer to obtain a physical address corresponding to the first virtual address, to enable the processing circuit to send a read request to a memory coupled to the PCIe device, the memory comprising a shared virtual memory.

In an example, the method further comprises, when the process specific information comprises a domain identifier, in response to a single invalidation request, invalidating a plurality of entries of a device translation lookaside buffer associated with the domain identifier, the plurality of entries associated with a plurality of process address space identifiers of a virtual machine having the domain identifier.

In another example, a computer readable medium including instructions is to perform the method of any of the above examples.

In a further example, a computer readable medium including data is to be used by at least one machine to fabricate at least one integrated circuit to perform the method of any one of the above examples.

In a still further example, an apparatus comprises means for performing the method of any one of the above examples.

In yet another example, a system comprises a CPU, an accelerator and a memory. The CPU may send an offload request to the accelerator, and may include: a MMU to translate a linear address to a physical address; and mask circuitry to mask one or more portions of a linear address and provide the masked linear address to the MMU. The accelerator coupled to the CPU may perform an operation in response to the offload request. And the memory is coupled to the CPU and the accelerator, where the CPU and the accelerator are to interact with the memory according to a SVM model, where the CPU is to send the offload request to the accelerator, the offload request comprising an unmasked linear address, the unmasked linear address including metadata of a process.

In an example, the system further comprises an IOMMU coupled between the CPU and the accelerator, where the accelerator is to mask the one or more portions of the linear address and provide the masked linear address to the IOMMU to obtain a physical address.

In an example, the accelerator comprises a cache memory having a plurality of entries, each of the plurality of entries to store process specific information for a process, the process specific information comprising mask information for the process, where the accelerator is to mask the one or more portions of the linear address using the mask information.

In an example, the accelerator further comprises a DevTLB having a plurality of entries each to store a virtual address-to-physical address translation received from the IOMMU, where in response to an invalidation message for a virtual machine having a first domain identifier, the accelerator is to invalidate entries of the DevTLB associated with the first domain identifier.

Understand that various combinations of the above examples are possible.

Note that the terms "circuit" and "circuitry" are used interchangeably herein. As used herein, these terms and the term "logic" are used to refer to alone or in any combination, analog circuitry, digital circuitry, hard wired circuitry, programmable circuitry, processor circuitry, microcontroller circuitry, hardware logic circuitry, state machine circuitry and/or any other type of physical hardware component. Embodiments may be used in many different types of systems. For example, in one embodiment a communication device can be arranged to perform the various methods and techniques described herein. Of course, the scope of the present invention is not limited to a communication device, and instead other embodiments can be directed to other types of apparatus for processing instructions, or one or more machine readable media including instructions that in response to being executed on a computing device, cause the device to carry out one or more of the methods and techniques described herein.

Embodiments may be implemented in code and may be stored on a non-transitory storage medium having stored thereon instructions which can be used to program a system to perform the instructions. Embodiments also may be implemented in data and may be stored on a non-transitory storage medium, which if used by at least one machine, causes the at least one machine to fabricate at least one integrated circuit to perform one or more operations. Still further embodiments may be implemented in a computer readable storage medium including information that, when manufactured into a SoC or other processor, is to configure the SoC or other processor to perform one or more operations. The storage medium may include, but is not limited to, any type of disk including floppy disks, optical disks, solid state drives (SSDs), compact disk read-only memories (CD-ROMs), compact disk rewritables (CD-RWs), and magneto-optical disks, semiconductor devices such as read-only memories (ROMs), random access memories (RAMs) such as dynamic random access memories (DRAMs), static random access memories (SRAMs), erasable programmable read-only memories (EPROMs), flash memories, electrically erasable programmable read-only memories (EEPROMs), magnetic or optical cards, or any other type of media suitable for storing electronic instructions.

While the present disclosure has been described with respect to a limited number of implementations, those skilled in the art, having the benefit of this disclosure, will appreciate numerous modifications and variations therefrom. It is intended that the appended claims cover all such modifications and variations.

What is claimed is:

1. An apparatus comprising:
a cache memory having a plurality of entries, each of the plurality of entries to store process specific information for a process;
a device translation lookaside buffer (DevTLB) having a plurality of entries each to store a virtual address-to-physical address translation received from an input/output memory management unit (IOMMU); and
at least one processor coupled to the cache memory and the DevTLB, wherein the apparatus comprises a Peripheral Component Interconnect Express (PCIe) device to couple with at least one central processing unit (CPU) and a shared virtual memory (SVM), to communicate, to the CPU, capability information to indicate that the PCIe device includes the cache memory to store the process specific information, and enable the cache memory in response to a configuration message from the CPU.

2. The apparatus of claim 1, wherein the process specific information includes mask information to indicate one or more address bits of a virtual address to be masked from the IOMMU.

3. The apparatus of claim 2, further comprising a mask circuit to receive a virtual address from the at least one processor and to mask one or more address bits of the virtual address according to the process specific information from an entry of the cache memory, wherein the masked one or more address bits of the virtual address comprises metadata associated with a process.

4. The apparatus of claim 3, wherein the apparatus is to receive a physical address from the IOMMU in response to the masked virtual address, the apparatus to send the physical address to the SVM, the PCIe device to couple to the SVM via a root complex, the root complex comprising the IOMMU.

5. The apparatus of claim 1, wherein each of the plurality of entries of the cache memory comprises:
a first field to store a process address space identifier;
a second field to store a portion of an address space; and
a third field to store the process specific information.

6. The apparatus of claim 5, wherein the second field is to store the portion of the address space to identify whether the entry is associated with a kernel space of the process or a user space of the process.

7. The apparatus of claim 1, wherein the process specific information comprises a domain identifier.

8. The apparatus of claim 7, wherein in response to an invalidation message for a first process having a first domain identifier, the DevTLB is to invalidate entries of the DevTLB associated with the first domain identifier.

9. The apparatus of claim 1, further comprising a configuration storage to store configuration information, the configuration information comprising an indicator to indicate presence of the cache memory, the cache memory comprising a process information cache.

10. A method comprising:
communicating, from a Peripheral Component Interconnect Express (PCIe) device to a processor, capability information of the PCIe device, the capability information to indicate that the PCIe device includes a process information cache to store process specific information;
receiving a configuration message from the processor and enabling the process information cache, in response to the configuration message;
receiving first process specific information from an input/output memory management unit (IOMMU); and
storing the first process specific information in a first entry of the process information cache in association with a process address space identifier (PASID).

11. The method of claim 10, further comprising storing the first process specific information in the first entry of the process information cache in association with one of a kernel address space or a user address space.

12. The method of claim 10, further comprising receiving the first process specific information in response to a request from the process information cache to the IOMMU.

13. The method of claim 12, further comprising sending the request to the IOMMU in response to a read request to a first virtual address from a processing circuit of the PCIe device.

14. The method of claim 13, further comprising:
using a mask included in the process specific information to mask at least a portion of the first virtual address; and
sending the masked first virtual address to a device translation lookaside buffer to obtain a physical address corresponding to the first virtual address, to enable the processing circuit to send a read request to a memory coupled to the PCIe device, the memory comprising a shared virtual memory.

15. The method of claim 10, further comprising, when the process specific information comprises a domain identifier, in response to a single invalidation request, invalidating a plurality of entries of a device translation lookaside buffer associated with the domain identifier, the plurality of entries associated with a plurality of process address space identifiers of a virtual machine having the domain identifier.

16. A system comprising:
at least one central processing unit (CPU), the at least one CPU to send an offload request to at least one accelerator, the at least one CPU comprising:
a memory management unit (MMU) to translate a linear address to a physical address; and
mask circuitry to mask one or more portions of a linear address and provide the masked linear address to the MMU;
the at least one accelerator coupled to the CPU, the at least one accelerator to perform an operation in response to the offload request, the at least one accelerator comprising:
a cache memory having a plurality of entries, each of the plurality of entries to store process specific information for a process;
an input/output MMU (IOMMU) coupled between the at least one CPU and the at least one accelerator; and
a memory coupled to the at least one CPU and the at least one accelerator, the at least one CPU and the at least one accelerator to interact with the memory according to a shared virtual memory (SVM) model,
wherein:
the at least one CPU is to send the offload request to the at least one accelerator, the offload request comprising an unmasked linear address, the unmasked linear address including metadata of a process; and
the at least one accelerator is to communicate, to the at least one CPU, capability information to indicate that the at least one accelerator includes the cache memory to store the process specific information, and enable the cache memory in response to a configuration message from the at least one CPU.

17. The system of claim 16, wherein the at least one accelerator is to mask the one or more portions of the linear address and provide the masked linear address to the IOMMU to obtain a physical address.

18. The system of claim 16, wherein
the process specific information comprises mask information for the process, wherein the at least one accelerator is to mask the one or more portions of the linear address using the mask information.

19. The system of claim 18, wherein the at least one accelerator further comprises a device translation lookaside buffer (DevTLB) having a plurality of entries each to store a virtual address-to-physical address translation received from the IOMMU, wherein in response to an invalidation message for a virtual machine having a first domain identifier, the accelerator is to invalidate entries of the DevTLB associated with the first domain identifier.

* * * * *